US006234799B1

(12) United States Patent
Lin (10) Patent No.: US 6,234,799 B1
(45) Date of Patent: May 22, 2001

(54) REAL-TIME IMU SIMULATOR

(75) Inventor: Ching-Fang Lin, Chatsworth, CA (US)

(73) Assignee: American GNC Corporation, Simi Valley, CA (US)

( * ) Notice: Subject to any disclaimer, the term of this patent is extended or adjusted under 35 U.S.C. 154(b) by 0 days.

(21) Appl. No.: 09/281,199

(22) Filed: Mar. 30, 1999

Related U.S. Application Data (60) Provisional application No. 60/080,813, filed on Apr. 6, 1998.

(51) Int. Cl.⁷ ........................................... G09B 9/08
(52) U.S. Cl. .............................. 434/30; 434/37; 434/29; 345/952
(58) Field of Search ................................ 434/30, 29, 43, 434/55, 118, 37; 345/952

(56) References Cited

U.S. PATENT DOCUMENTS

| 4,179,823 | * | 12/1979 | Sullivan et al. | 35/10.24 X |
| 4,751,662 | * | 6/1988 | Crosbie | 364/578 X |
| 5,102,072 | * | 4/1992 | Egan et al. | 244/195 X |
| 5,240,416 | * | 8/1993 | Bennington | 434/30 X |
| 5,388,990 | * | 2/1995 | Beckman | 434/38 X |
| 5,616,030 | * | 4/1997 | Watson | 434/38 X |
| 5,672,872 | * | 9/1997 | Wu et al. | 250/330 |
| 5,689,682 | * | 11/1997 | Peasley et al. | 395/500 X |

* cited by examiner

Primary Examiner—Jessica J. Harrison
Assistant Examiner—Chanda Harris
(74) Attorney, Agent, or Firm—Raymond Y. Chan; David and Raymond Patent Group (57) ABSTRACT

A real-time IMU simulator for an Inertial Measurement Unit (IMU) of an installed avionics system of a vehicle includes a 6DOF flight simulator; an IMU computer; and a 6DOF (Degree of Freedom) interface. The 6 DOF interface is connected between the 6DOF flight simulator and the IMU computer for transferring flight trajectory data from the 6DOF flight simulator to the IMU computer. The IMU computer is adapted for receiving flight state data and calculating IMU simulation data and outputting the IMU simulation data to an IMU signal generation board. The IMU signal generation board is adapted for receiving the IMU simulation data and generating IMU signals and injecting the IMU signals to the installed avionics system.

18 Claims, 6 Drawing Sheets

REAL-TIME IMU SIMULATOR

CROSS REFERENCE OF RELATED APPLICATION

This is a regular application of a provisional application, application No. 60/080813, filed Apr. 6, 1998.

FIELD OF THE PRESENT INVENTION

The present invention relates to an inertial measurement unit simulator, and more particularly to a real-time inertial measurement unit (IMU) simulator in response to inertial measurement simulation for global positioning system (GPS) guidance receivers/inertial navigation systems(INS). This invention was made with Government support under Contract No. F08635-98-6865. The Government has certain rights in the invention.

BACKGROUND OF THE PRESENT INVENTION

Figure 1:
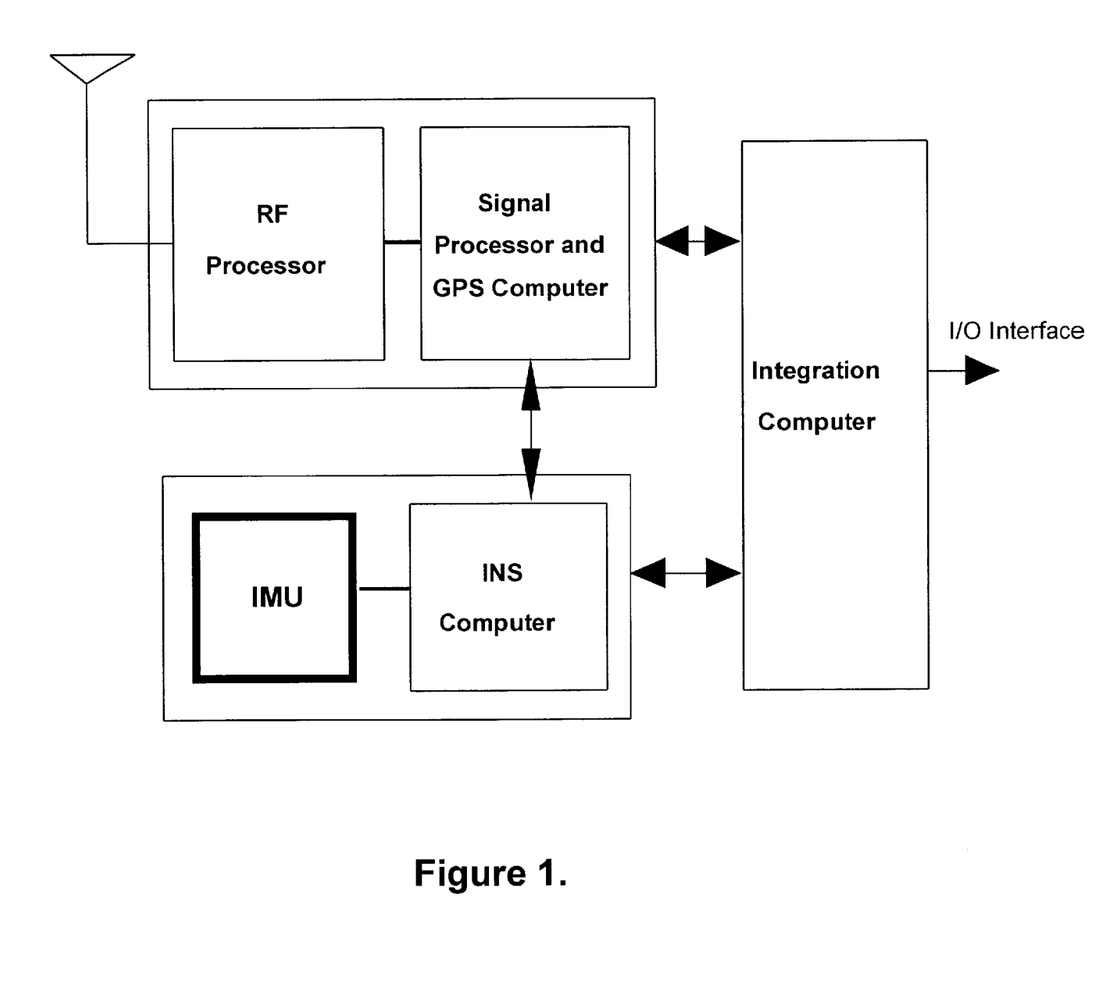
FIG. 1 is a block diagram illustrating the GPS/INS Integration System Structure.

A typical integrated GPS/INS system is depicted as FIG. 1. The GPS receiver and IMU are the two major parts in the integrated system. The GPS receiver receives RF signals from the GPS satellites while the IMU produces its own signals because of its self-contained characteristics. From the viewpoint of installed system testing, the simulation of a GPS receiver and an IMU is much different. Usually a real-time GPS satellite constellation RF simulator is used to generate the GPS satellite signals and inject them into the GPS receiver. But we cannot inject electronic signals into an IMU from outside.

A straightforward method for dynamic ground testing is the application of the flight motion tables that provide the motion of the aircraft or munitions during simulated flight in an installed system environment. With this method, the GPS receiver receives actual satellite RF signals and the IMU produces dynamic inertial measurement signals itself, for the integrated system is actually in motion. But this motion table method is not a viable solution. It needs a large set of testing equipment, its operational cost is high, its dynamic motion is limited, and its data acquisition during the simulation is not convenient. Therefore, the real-time computer simulation system for the dynamic ground testing of the installed system is desired.

SUMMARY OF THE PRESENT INVENTION

The main objective of the present invention is to develop and validate the software and hardware design of a real-time Inertial Measurement Unit (IMU) simulator. The IMU simulator is installed system test equipment. It supports the final integration of a developmental Guidance, Navigation, and Control (GNC) system into an aircraft or other vehicles. It assures testers that GNC avionics on board an aircraft work properly before and during a flight test. It helps debug on-board GNC avionics and verify the system performance. During the test, the IMU simulator receives real-time flight data from the 6DOF trajectory generator and produces IMU electronic signals according to the IMU measurement models and error models defined by the user. The simulated electronic signals are injected into the installed avionics system causing the on-board GNC system computer into "thinking" that the aircraft is really flying. The IMU simulator is useful equipment for ground testing of installed systems, laboratory hardware-in-the-loop dynamic simulation, and GNC system analysis and development. It has wide applications in both the military sector and the commercial world.

Another objective of the present invention is to provide a real-time inertial measurement unit simulator, wherein IMU models expressed in different coordinate systems have been developed. In the developed models, three coordinate systems are used: Earth-Centered Inertial coordinate system (denoted ECIZ), Earth-Centered Earth-Fixed coordinate system (denoted ECEF), and Navigation (or local geographical) coordinate system (denoted N). For different trajectory reference frames, the IMU measurement models have different mathematical forms. In order to build high accuracy IMU models, the gravity model of the earth was also included.

Another objective of the present invention is to provide a real-time inertial measurement unit simulator, wherein The IMU error modeling and simulation methods were investigated and the IMU error simulation methods were evaluated by the experimental system. In the software design for the error models, in addition to a generic error model, we also provide several error models for specific IMU sensors.

Another objective of the present invention is to provide a real-time inertial measurement unit simulator, wherein the proposed real-time IMU simulator is designed and realized on a high-performance PC computer. The PC's richness in software and hardware support makes it possible for us to have a variety of options in the configuration design of the IMU simulator. A modularized software design method is employed and the programs are organized in functional modules. The software is programmed mainly in the C/C++ language. The Matlab/Simulink software and the Labview software are used to test, simulate and evaluate the algorithm and software design for the IMU simulator.

Another objective of the present invention is to provide a real-time inertial measurement unit simulator, wherein a survey of current IMU electronics was made and based on the analysis results we found that though there are various types, the IMU output signals can be classified into the following four categories: (1) Analog signals, (2) Pulse signals, (3) Parallel digital signals or parallel standard bus emulation, and (4) Serial digital signals or serial standard bus emulation. According to the classification of the IMU output signals, a three-level hardware design was proposed and investigated.

Another objective of the present invention is to provide a real-time inertial measurement unit simulator, wherein the aims of the simulation were (1) to verify the correctness of the mathematical models, (2) to select a suitable computation algorithm, (3) to analyze the computation errors, and (4) to validate the fidelity of the simulated IMU signals. The simulation models are mainly programmed by using Matlab/Simulink software. The Matlab/Simulink program modules can be converted to the corresponding C language modules by a code generator in the Matlab/Simulink software. The verified simulation models are then used to validate the C/C++ program developed for the IMU simulator. Combining the use of Matlab/Simulink and Labview software, the simulation models can also generate real-time electronic signals. The generated real-time IMU signals can be displayed or can be injected into the INS system if it contains a DAC board and an injection connector.

Accordingly, in order to achieve the above objective, the following innovative technical features have been brought to our investigation.

The correct and accurate IMU measurement models are essential for the IMU simulator. The measurement models of the IMU are determined by the physical and kinematics principles of the inertial sensor. They describe the relationships between the ideal outputs of an IMU and the motion of the vehicle on which the IMU is installed. If a real IMU is installed in an aircraft or munition, it measures the vehicle's motion and produces measurement signals or data accordingly. An IMU simulator, however, must produce measurement signals or data, through a software model, according to the trajectory generated by the 6DOF flight simulator. Once the trajectory of a flight mission is defined, the 6DOF flight simulator can produce real-time flight states over the entire simulation period. A measurement model of the IMU simulator is required to produce ideal IMU outputs.

Generally, a trajectory generator consists of a full 6DOF kinematics model. It calculates a state vector consisting of several scalar variables to fully describe the trajectory of the simulated vehicle. Typically, the flight state variables include:

1. Time.
2. Translational position, velocity and acceleration.
3. Rotation matrix, angular velocity, and angular acceleration.

Because the flight trajectory or states can be expressed in different coordinate systems according to mission requirements or tester preference, we have to develop a suite of IMU measurement models expressed in different frames. In the developed models, three coordinate systems are used: Earth-Centered Inertial coordinate system (denoted ECIZ), Earth-Centered Earth-Fixed coordinate system (denoted ECEF), Navigation (or local Geographical) coordinate system (denoted N). For different trajectory reference frames, the IMU measurement models have different mathematical forms.

The error models of the IMU are the basis for the high fidelity simulation. In order to generate signals that are identical to that of the real IMU to be simulated, the IMU error models must be included in the simulation. In the IMU simulator, the error models are devised to characterize the accuracy of the IMUs. During the simulated ground test, an error model is used to investigate the effects of the IMU sensor errors on the INS/GPS navigation system. Different types of gyroscopes and accelerometers are used in IMUs. They are based on various physical principles, and generally different types of mathematical formulations model their error characteristics. In the software design for the error models, in addition to a generic error model, we also provide several error models for specific sensors, for example, the ring laser gyro (RLG) and the microelectromechanical (EM) gyro and accelerometer.

The core technology in the IMU simulator is the hardware and software design for the IMU signal generation. The proposed real-time IMU simulator is designed and realized on a high-performance PC computer. The PC's richness in software and hardware support makes it possible for us to have a variety of options in the configuration design of the IMU simulator. With the PC-based design, we selected an optimized configuration for the simulator which leads to an effective integration of software and hardware design for the IMU simulator, for there is always a trade off between the software design and the hardware design for a certain functional realization.

From the viewpoint of hardware, the simulator can be divided into three parts, an interface between the 6DOF flight simulator and PC, a PC computer as a computing platform, and a plug-in IMU signal generation board.

The interface between the 6DOF flight simulator and the PC transfers flight state data from the 6DOF flight simulator to the PC. The interface may be realized in several types, such as standard RS-232C serial interface, RS-422 serial interface, Ethernet LAN interface or MIL-STD-1553A/B interface, according to a certain application environment. In the IMU simulator design, we provide software support for the above four types of standard interfaces. The data transferred from the flight simulator include three aircraft position variables, attitude variables, velocity variables, and acceleration variables. These trajectory state variables can be expressed in different coordinate systems, and we can transform them into the desired navigation coordinates. Another six flight state variables can be derived from the above six flight state variables. They are the aircraft translational velocities and angular velocities. Using the twelve flight state variables, the computer can produce complete inertial measurements for the IMU simulation.

The PC computer is the host hardware and software platform for the IMU simulator. The operation of the entire simulator is under the control of the computer. Data processing, user interfacing and timing control are the major functions of the host computer. The IMU measurements and sensor errors are formed in the computer by the software. Through the CRT monitor, mouse and keyboard, under the support of the software, the user can operate the simulator, and modify its parameters easily. The computer can also control the signal generator board through mode setting, parameter modification, and timing control.

A modularized software design method is employed and the programs are organized in functional modules. The software is programmed mainly in the C/C++ language. The MATLAB/SIMULINK software and the LABVIEW software are used to test, simulate and evaluate the algorithm and software design for the IMU simulator.

In order to simulate different types of IMUs used in various application systems, for a certain functional block in the software, different program modules are provided in the IMU simulation library for the user to select. Thus, the user can build a specific simulation model that can precisely simulate the real IMU that is used in the installed system under test.

Electronic signal generation and injection is one of the key features of the IMU simulator, and it is also one of the most critical design issues. What makes the signal generation and injection of an IMU simulator a difficult issue is that the real IMU in the INS is a self-contained device. It produces inertial measurements by itself, so it does not need to receive any signals from the outside. And also, when the vehicle is stationary it cannot produce a dynamic signal. Therefore, in the simulated ground test of the installed system, the real IMU in the vehicle has to be separated from the system and replaced by an IMU simulator. This replacement inherently causes an intrusion to the installed system. What makes this issue more complicated is that at present there is no interface standard for IMU signals and connectors. There are many types of gyros and accelerometers, which are fabricated by different manufacturers and have various signal types and interface connection requirements.

A survey of current IMU electronics was made and based on the analysis results we found that though there are various types, the IMU output signals can be classified into the following four categories:

(1) Analog signals.
(2) Pulse signals.
(3) Parallel digital signals or parallel standard bus emulation.
(4) Serial digital signals or serial standard bus emulation.

According to the classification of the IMU output signals, we need to design different types of signal generation circuits to produce a specific type of signal required by the system to be tested. These signal generation circuits are designed as a series of optional modules. Signal module design is based on the modularized IMU simulator architecture design. In our design, the entire IMU simulator is reconfigurable. The backplane of the simulator is a standard bus, for example, ISA bus or VMEbus. The processor module, memory module, and serial communication module can be selected from the off-the-shelf avionics modules produced by the electronics manufacturers. The signal generation module is designed specifically for the IMU simulator to meet the application requirements.

The signal regulator and connector board must be designed for the specific user according to the specific IMU used in the system. This means that there is no general purpose signal regulator and connector board. For a specific IMU, we have to design a connector board to match it. This is because even if two IMUs have the same types of signals, they often have different signal ranges, scales, voltages, currents and different connector arrangements. In practice, however, the user-specific signal regulator and connector board does not cause any difficulty, for this board is often very simple. It usually consists of an amplifier, a buffer, a coupler and sometimes logic. Of course, it also forms a suitable connector for the specific installed system in order to replace the real IMU.

The aims of the simulation are: (1) to verify the correctness of the mathematical models, (2) to select a suitable computation algorithm, (3) to analyze the computation errors, and (4) to validate the fidelity of the simulated IMU signals. The simulation models are mainly programmed by using Matlab/Simulink software. The Matlab/Simulink program modules can be converted to the corresponding C language modules by a code generator in the Matlab/Simulink software. The verified simulation models are then used to validate the C/C++ program developed for the IMU simulator. Combining the use of Matlab/Simulink and Labview software, the simulation models can also generate real-time electronic signals which are sent out through a D/A converter board plugged in the computer. This simulation system has a very effective user interface through which the trajectory selection and IMU parameter modification can be done with ease. The simulated IMU signals can be displayed or the real-time electronic signals can be sent out by a DAC board.

The ground test process is simulated by the simulation system developed in Matlab/Simulink. The ideal trajectory of the aircraft is generated by the trajectory block. The trajectory in this system is represented in the N frame by the translational acceleration and the angular velocity of the aircraft. The trajectory states are input into the IMU simulator, and through the IMU simulator and INS navigator a resolved trajectory is produced. The differences of the two trajectories are processed by the evaluator block to obtain the information about the simulation accuracy in both the simulator and navigator. This simulation system can be used to verify the correctness of the IMU measurement models, to analyze the computation error of the simulation algorithms, and to demonstrate the effects of the IMU sensor errors.

Based on the IMU simulation system, an experimental system for an IMU simulator was built. With an added multiple channel D/A converter board in the IMU simulator computer we can produce analog electronic signals as IMU outputs. And with an added A/D converter board in the INS computer, we can get the simulated IMU signals. The D/A and A/D boards have timer and clock functions to synchronize the operation of the two computers.

This experimental system can be readily used to verify the correctness and accuracy of the PC-based IMU simulator. With some modifications and additional software this experimental system can also be used to validate the error models of the IMU simulator. In the simulation, the generated real-time signals are monitored by an oscilloscope and a dynamic signal analyzer to assess the quality of the signals. The dynamic signal analyzer is also used to evaluate the IMU random error simulation.

The generated real-time IMU signals can be displayed or can be converted into electronic signals and injected into the INS system if it is armed with a signal generation circuit (a DAC board) and an injection connector. A PC is used as the 6DOF trajectory generator. The PC-based IMU simulator receives these trajectory data and produces real-time IMU signals.

The demonstration system has three operation modes, real-time simulation mode to receive trajectory data from a virtual 6DOF generator, off-line simulation mode to get trajectory data from a stored file, and internal mode to get trajectory data from a generator inside the IMU simulator. The simulated IMU signals can be outputted in two ways, real-time waveform display, and real-time analog signal output if a DAC board is used in the simulation computer. Through the user interface, we can select operation the mode, choose output methods, and define the IMU model parameters and error parameters.

DETAILED DESCRIPTION OF THE PREFERRED EMBODIMENT

The present invention provides a real-time simulator for an Inertial Measurement Unit (IMU) of a vehicle on the air, land, and space, in order to debug an on-board Guidance, Navigation and Control System and verify system performance.

The major application of the IMU simulator is in the ground testing of a GPS/INS integrated guidance and navigation system. For the simulation of the IMU, its signals have to be either self-generated or produced by an IMU simulator. These two IMU signal generation approaches correspond to two types of GPS/INS ground dynamic testing methods.

Figure 2:
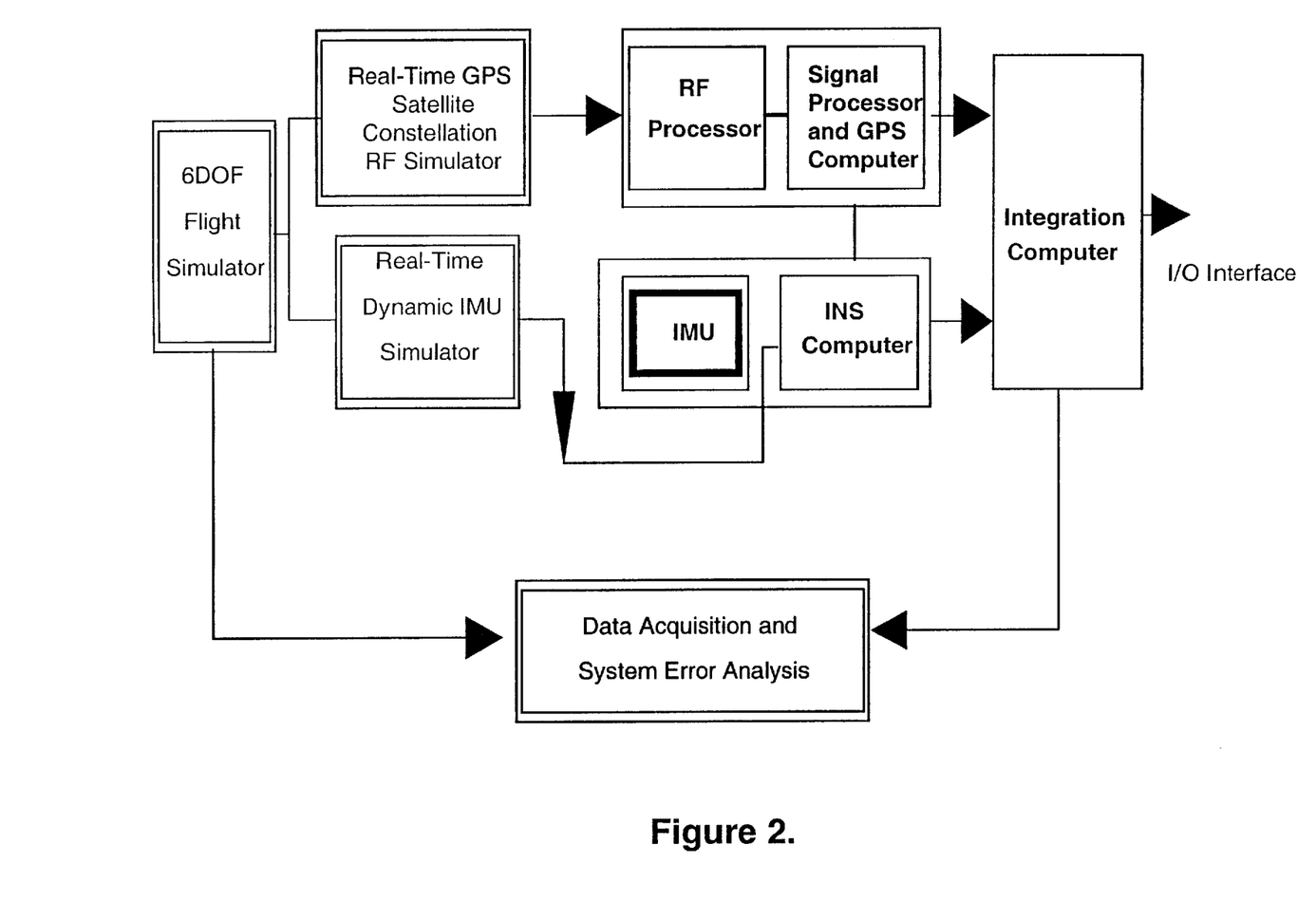
FIG. 2 is a block diagram illustrating the simulated Ground testing of an installed system.

With the simulation method, during the testing, the installed system on the aircraft is motionless, so the testing can be carried out in a laboratory or in an anechoic chamber facility. However, simulation test equipment is required. The major simulation equipment includes a Six Degree-Of-Freedom (6DOF) flight simulator, a real-time GPS satellite constellation RF simulator, and a real-time dynamic IMU simulator. Unlike a GPS receiver, the IMU cannot produce dynamic signals by itself while the aircraft is stationary and we cannot inject signal into it as well, so it must be replaced by an IMU simulator. FIG. 2 shows the application of the IMU simulator in the ground testing of the installed system.

In the stage of ground testing, the entire GPS/INS integrated system has been already installed into the aircraft. The requirement of easy, effective, and least intrusive signal injection is the most important issue in the simulated ground testing. For the GPS receiver, this problem is settled by using an existing GPS satellite constellation RF simulator. The generated GPS RF signals are analogous to the real GPS satellite signals. They can be injected into the GPS receiver directly from the antenna. For IMU simulation, however, we must devise a method to achieve the easy, effective, and least intrusive injection of simulated IMU signals into the GPS receiver or the INS computer. We have developed an innovative method to solve this problem. We embed a versatile IMU electronic signal generator in the IMU simulator, which consists of several optional plug-in circuit boards. This electronic signal generator can produce various types of standard IMU signals that can be divided into four classes: analog, pulse, digital parallel, and digital serial signals. The electronic signal generation and least intrusive injection are the first requirement for the IMU simulator.

The second key requirement for the simulator is the on-line modification of the IMU simulator parameters. This facility makes the IMU simulator adaptive to various testing environments and is applicable to a wide range of GPS/INS integrated navigation or guidance systems. The IMU simulator includes error parameters of gyros and accelerometers and signal electrical parameters. The software design of the IMU simulator provides a set of menus or a figurative window for users to modify the simulation parameters with ease.

The third key requirement is the reliability of the entire IMU simulator system. Because in the ground-testing environment there are a large number of electric and electronic equipment in operation at the same time and in a relatively small space, the electro-magnetic interference is generally quite severe. In order to speed up the development, lower the cost, and ease the testing of the simulator system, a PC based IMU simulator has been investigated and developed. But the PC based design may have weaknesses in some applications. Except for its big size which may be inconvenient in some field testing environments, the PC microcomputers are not designed for military or industrial application environments. Thus, it may be difficult for the PC-based IMU simulator to meet the requirements of EMC in some high interference application environments. In order to develop the IMU simulator as a general purpose product that is suitable for both commercial and military applications, we will design, develop and fabricate an IMU simulator that consists of avionics modules on an open standard bus. The major product oriented improvements and modifications include the following:

1. The large PC microcomputer is discarded and the avionics module-based simulator design is introduced. The size of the simulator will be greatly reduced and the reliability enhanced.

2. Careful EMC design is highlighted to attain a robust IMU simulator for various application environments.

3. A user friendly interface feature is retained by adding to the avionics module a standard RS-232C serial port to the PC. Under the support of software, a user can define the mode and modify the parameters of the IMU simulator before the operation. An EEPROM is embedded in the avionics module to store the user-defined data.

The fourth key requirement for the simulator is the electronic signal regulation and connector wiring. It produces electronic signals, which can be injected into the GPS/INS integrated system directly from the sensor interfaces. But in the design of the generator, there is a difficulty in practice. There are many kinds of IMUs in applications, and many different manufacturers fabricate them. So, they generally have different types of output signals and even if the signal type is the same, the parameters or specifications of the signals and the connector are different. In the present invention, three approaches are proposed to overcome the difficulty. First, four types of plug-in signal generator boards are provided. They produce analog, pulse, digital parallel, and digital serial signals respectively. Second, for each type of board, the user through controlling the signal regulator circuits can modify the signal parameters. Third, a user-specified connector wiring box is designed to enable the direct replacement of the IMU by the simulator and electronic signal injection. These generator designs make the IMU simulator flexible for a wide range of GPS/INS systems. According to certain applications, the user can choose a certain type of generator board and define the signal parameters and make the simulator completely suitable for his GPS/INS system.

The IMU simulator is a combination of advanced software and hardware technologies. The software implements the IMU measurement models and error models according to the user-defined flight trajectory, sensor models and parameters. The hardware converts the simulated IMU outputs into electronic signals and injects the signals into the installed system. The injected signals must be compatible with the electronics of the onboard Inertial/Global Positioning System and the injection method must present the least intrusion to the installed system.

The Real-Time IMU simulator of the present invention comprises the following devices:

(a) A 6DOF(Degree of Freedom) interface, which is connected between a 6DOF flight simulator and a IMU computer and transfers flight trajectory data from the 6DOF flight simulator to the IMU computer.

(b) The IMU computer, which is served as a computing platform for receiving flight state data and calculates IMU simulation data and outputs IMU simulation data to a IMU signal generation board.

(c) The IMU signal generation board for receiving IMU simulation data and generating IMU signals and injecting IMU signals to onboard avionics systems.

The 6 DOF interface and The IMU signal generation board may be outside from the IMU computer through a cable to be connected with the IMU computer, and may also be plugged in the IMU computer through a bus.

The 6DOF flight simulator calculates the 6DOF trajectory of the simulated vehicle, and outputs the 6DOF trajectory through the 6 DOF interface in real-time way to the IMU computer; the IMU computer computes the IMU simulation data and outputs the IMU simulation data to the IMU signal generation board; the IMU signal generation board generates the specific IMU electronic signals to the avionics system of the simulated vehicle.

Generally, a 6DOF flight simulator consists of a full 6DOF kinematics model. It calculates a state vector consisting of several scalar variables to fully describe the trajectory of the simulated vehicle. Typically, the flight state variables include:

1. Time.
2. Translational position, velocity and acceleration.
3. Rotation matrix, angular velocity, and angular acceleration.

According to a certain application environment, the 6DOF interface may be realized in several types, such as standard RS-232C serial interface, RS-422 serial interface, Ethernet LAN interface or MIL-STD-1553A/B interface.

To obtain a simple IMU simulator to meet variable requirements, the 6DOF flight simulator can generate 6DOF data before performing a ground test of onboard avionics system, and save the 6DOF data into a data file with time label. During the ground test, the 6DOF flight simulator just sends 6DOF data from the data file to the IMU computer.

To obtain a simple IMU simulator to meet variable requirements, the 6DOF flight simulator can generate 6DOF data before performing a ground test of onboard avionics system, and save the 6DOF data into a data file with time label. Then the data file is copied to the IMU computer. During the ground test, the IMU computer just needs read the 6 DOF data from the data file and calculates the IMU simulation data in real time way to the IMU signal generation board.

The IMU computer is the host hardware and software platform for the IMU simulator. The operation of the entire IMU simulator is under the control of the IMU computer. Data processing, user interfacing and timing control are the major functions of the IMU computer. The IMU measurements and sensor errors are formed in the IMU computer by the software. The IMU computer can also control the signal generator board through mode setting, parameter modification, and timing control. The IME computer further comprises:

B.1 Flight Data Interface Module

These program modules are actually a group of communication driver programs. In the ground test, a 6 degree-of-freedom flight simulator is used to generate the aircraft trajectory. The generated flight data are sent to the IMU simulator through the 6DOF interface. In practice, different types of interface circuit boards and data formats or protocols could be used in the communication between the 6DOF flight simulator and the IMU simulator. Thus, in the simulation software a group of program modules are provided which can be used to drive different 6DOF interfaces with their designated data formats.

B.2 Trajectory Generation Module

This program module is an internal trajectory generator that makes the IMU simulator a self-contained system. If the 6DOF flight simulator is available, the IMU simulator receives the generated trajectory data through a communication interface. In some applications, if there is no flight simulator to generate flight data for the IMU simulator, the input of the simulator can be switched to an internal trajectory generation module. According to the definition of the user, the internal trajectory generation module can produce trajectory data with respect to different coordinate systems.

B.3 Gyro Measurement Module

This Gyro Measurement Module receives the 6DOF data and outputs ideal simulation output data of gyros of the simulated IMU. In the IMU simulation, because the aircraft motion can be represented in various reference frames, the gyro measurement models are different in mathematical formulation and software implementation. Furthermore, in the IMU simulation, adopting different earth geodetic models can also produce different gyro measurement models. The following is a brief summary of the factors that affect the measurement model formulation of the gyros.

B.3.1 The selection of the reference frame for representing the aircraft motion:

Earth-Centered Inertial coordinate system (denoted ECIZ).

Earth-Centered Earth-Fixed coordinate system (denoted ECEF).

Navigation (or Local Geographical) coordinate system (denoted N).

B.3.2 The selection of the earth geodetic model:

WGS-84 ellipsoid model.

The ideal sphere model.

The approximate model that ignores the earth's shape.

In the IMU simulator software, a group of program modules are provided for the simulation of different gyro measurement models.

B.4 Gyro Error Module

The Gyro Error Module includes a gyro error model and receives the 6DOF data and outputs errors of simulation output data of gyros of the simulated IMU. In the IMU simulator a generic gyro error model is provided, which includes the following error factors:

(1) Fixed gyro bias.
(2) Random constant gyro drift.
(3) Random walk of the gyro drift.
(4) Temperature related gyro drift.
(5) Nonlinear error of the gyro.
(6) Scale factor error of the gyro.
(7) Specific force induced gyro error.
(8) Sensor axis misalignment error.
(9) Oscillating error.

A generic program module is provided to simulate the gyro errors. The error parameters in the module can be modified by the user through the monitor and interface modules in the IMU simulator. Special error models for RLG and FOG are also provided for use in some situations where the generic model is not suitable for the high fidelity simulation.

B.5 Accelerometer Measurement Module

This Accelerometer Measurement Module receives the 6DOF data and outputs ideal simulation output data of accelerometers of the simulated IMU. Similar to the gyro measurement model, all of the accelerometers have the same measurement model in principle. In the IMU simulation, however, because the aircraft motion can be represented in various reference frames, the accelerometer measurement models are different in mathematical formulation and software implementation. Furthermore, in the IMU simulation, adopting different earth geodetic models and gravity models can also produce different accelerometer measurement models. The following is a brief summary of the factors that determine the measurement model representation of the accelerometers.

B.5.1 The selection of the reference frame for presenting the aircraft motion:

Earth-Centered Inertial coordinate system (denoted ECIZ).

Earth-Centered Earth-Fixed coordinate system (denoted ECEF).

Navigation (or Local Geographical) coordinate system (denoted N).

B.5.2 The selection of the earth geodetic model:

WGS-84 ellipsoid model.

The ideal sphere model.

The approximate model that ignores the earth's shape.

B.5.3 The selection of the gravity model:

The international gravity model.

The simplified international gravity model.

The approximate constant gravity model.

The international gravity model with local anomaly modification.

In the IMU simulator software design, a group of the program modules are provided for the simulation of different accelerometer measurement models.

B.6 Accelerometer Error Module

The accelerometer Error Module includes a accelerometer error model and receives the 6DOF data and outputs errors of simulation output data of accelerometers of the simulated IMU. In the IMU simulator a generic accelerometer error model is provided, which includes the following error factors:

(1) Fixed accelerometer bias.

(2) Random constant accelerometer bias.

(3) Random walk of the accelerometer bias.

(4) Temperature related accelerometer bias.

(5) Nonlinear error of the accelerometer.

(6) Scale factor error of the accelerometer.

(7) Sensor axis misalignment error.

(8) Oscillating error.

A generic program module is provided to simulate the accelerometer errors. The error parameters in the module can be modified by the user through the monitor and interface modules in the IMU simulator.

B.7 Electronic Signal Generation Module

These modules are in fact a group of driver programs for the signal generation hardware boards. In the IMU simulator, four types of signal generation boards are designed to generate four types of IMU signals:

(1) Analog signals.

(2) Pulse signals.

(3) Parallel digital signals.

(4) Serial digital signals.

Most of IMUs with conventional gyros and accelerometers output analog or pulse signals. In recent years, with the development of microelectronics and inertial sensor technology, manufacturers tend to embed a microprocessor in the IMU to produce a so-called smart IMU. Apart from the capability of error compensation and a built in test, the smart IMU can output digital signals on standard parallel or serial data buses. This feature greatly simplifies the interfacing between the IMU and system computer. From the viewpoint of the IMU simulator, however, the smart IMU is more complex. In order to simulate the signals of a smart IMU, we have to include a smart signal generation board in the IMU simulator. In the software design for the IMU simulator, a group of program modules are provided to manipulate different types of signal generation boards to produce different types of electronic signals.

B.8 User Interface and Monitoring Module

This program module provides an interface between the user and the IMU simulator. Through this module, the user can communicate with other modules in the simulator. It has the following three functions:

(1) Monitoring the real-time operation of the IMU simulator. This user interface module is capable of observing the outputs and inputs of other simulation modules during the operation of the IMU simulator.

(2) Selecting the proper modules from the simulation library to build a user specific IMU model. This function makes it possible for the users to define an IMU simulation model that is suitable for their application situations. Therefore, this function can create a versatile IMU simulator which will find wider applications in both the military sector and the commercial world.

(3) Modifying the parameters of the simulator. Through this user interface module, the user can make direct access to all of the user-modifiable parameters in the simulator.

The design of the user interface module is based on the Windows programming techniques. A set of menus and dialog boxes is provided for simulation module selection and parameter modification. Incorporating the LABVIEW programming technique into the interface module design, we can also provide waveform display in the user windows as long as this function does not cause unacceptable time delays in the real-time simulation.

Electronic signal generation and injection is one of the most important features of the IMU simulator and it is also one of the most difficult design issues. Based on a survey of current IMU electronics was made and the analysis results, we found that though there are various types, the IMU output signals can be classified into the following categories:

1. Analog signals. In many commercial and military applications, the outputs of the IMU are analog signals, especially for low performance IMUs which are often used with a GPS receiver to form an integrated system. The analog signal is easy to generate and the IMU connector to the system is often easy to separate. But the accuracy of the analog signal is limited.

2. Pulse signals. Most high performance gyros and accelerometers provide pulse outputs. RLG and FOG are inherently digital sensors, and many high performance electromechanical gyros and accelerometers have a pulse modulated force rebalance loop. Pulse output signals have many advantages over analog signals. The pulse signals can easily attain high accuracy and resolution and at the same time have excellent anti-interference capability.

3. Parallel digital signals. Some IMUs have embedded logic circuits or microprocessors which can output parallel digital signals or even implement a standard parallel bus. In the INS, this type of IMU can send signals to the parallel interface of the computer or to the backplane bus of the navigation system.

4. Serial digital signals. Recently, IMU manufacturers tend to embed a high performance microprocessor into the IMU to form a so-called "smart" IMU. This kind of IMU is capable of error compensation and built-in test. The IMU output signals are sent out by the microprocessor through a standard serial bus, for example, RS-422, 1553 bus, etc.

According to the classification of the IMU output signals, we need to design different types of signal generation circuits to produce a specific type of signal required by a specific system. These IMU signal generation circuits are designed as a series of optional modules:

3.1 Analog Module 3.2 Pulse Module 3.3 Parallel Module 3.4 Serial Module.

Figure 3:
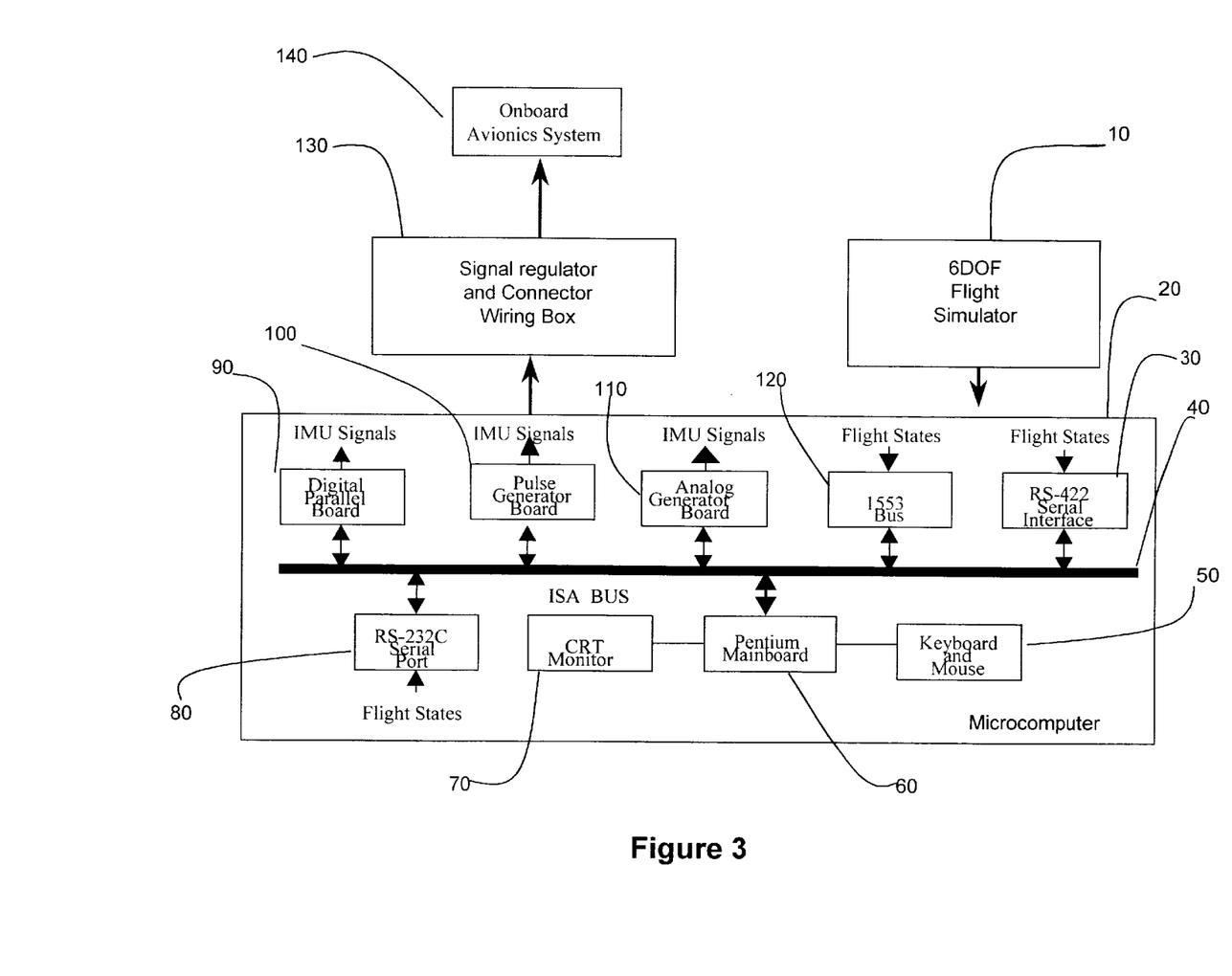
FIG. 3 is a block diagram illustrating the configuration of PC-based simulator.

The IMU simulator can be implemented based on a PC (Personal Computer) computer, so that the PC's richness in software and hardware market support can be made use of, referring to FIG. 3.

The 6DOF flight simulator 10 generates 6DOF trajectory data and outputs 6DOF trajectory data to the Pentium Mainboard 60 of the IMU simulator 20 through the 6DOF interface. The 6DOF interface has some optional boards for different 6DOF flight simulators, as follows:

A: 1553 bus 120,

B: RS-422 serial interface 30,

C: RS-232c serial port 80

D: other adapter, such as Network adapter.

Through the CRT monitor 70, mouse and keyboard 50, under the support of the software, the user can operate the simulator, modify its parameters easily, and observe IMU data.

The Pentium Mainboard 60 handles all management of the IMU simulator 20 and calculates IMU simulation data, performing the following modules:

A: Flight Data Interface Module

B: Trajectory Generation Module

C: Gyro Measurement Module

D: Gyro Error Module

E: Accelerometer Measurement Module

F: Accelerometer Error Module

G: Electronic Signal Generation Module

H: User Interface and Monitoring Module

The IMU signal generation board further comprises:

A: Digital parallel board 90;

B: Pulse generator board 100;

C: Analog generator board 110.

These optional boards of the IMU signal generation can be selected to adapt various types of IMU output signal of the simulated IMU.

The signal regulator and connector board 140 is connected between the IMU signal generation and the onboard avionics system 140, and is used for the specific user according to the specific IMU used in the simulated system. It means that there is no general-purpose signal regulator and connector board. For a specific IMU, we have to design a connector board to match it. This is because even if two IMUs have the same type of signal, they often have different signal ranges, scale factors, voltages, currents, and different connector arrangements. This board is often very simple. It usually consists of an amplifier, a buffer, a coupler and sometimes logic. It also forms a suitable connector for the specific installed system in order to replace the real IMU.

The Pentium Mainboard 60 can be replaced by other CPU mainboards to obtain different computational speed.

The PC-based IMU Simulator is, as the PC-based system, easy to design, low-cost to fabricate and convenient to program. But for specific application purposes, the PC-based IMU simulation may have a few inherent limitations, for example, its size, reliability, maintainability, and electromagnetic compatibility (EMC). Based on this consideration, an avionics module based IMU simulator design will achieve:

Small size.

High reliability.

Standardization design to meet the requirements of military and commercial applications.

Electro-Magnetic Compatibility Improvement.

Suitability for field testing applications.

Intelligent user interface.

Multiple types of I/O interfaces for downloading, monitoring and debugging software as well as flight data.

Figure 4:
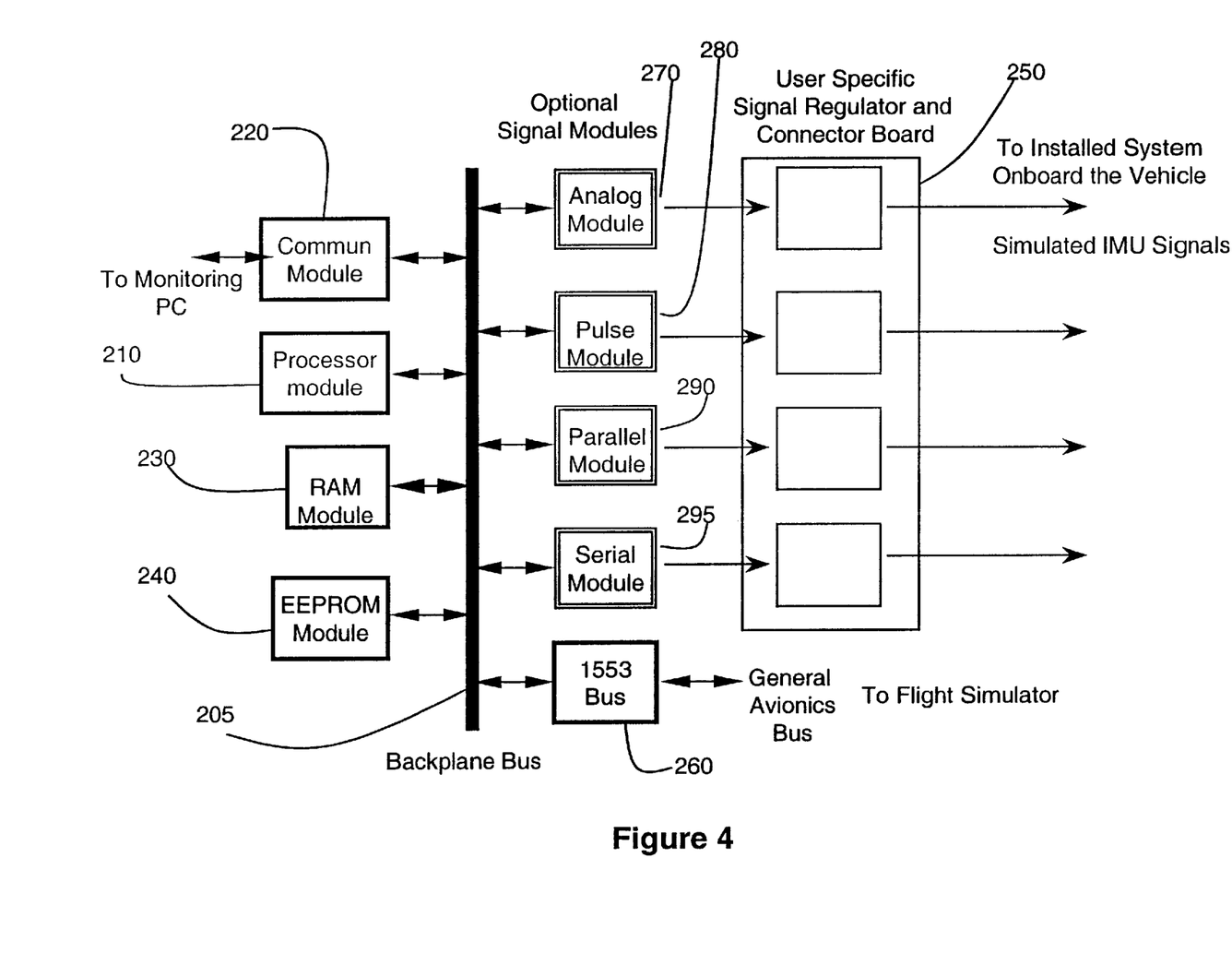
FIG. 4 is a block diagram illustrating the modularized architecture of the IMU simulator.

Referring to FIG. 4, the avionics module based IMU simulator comprises:

(1) a backplane bus 205 for providing connection among modules;

(2) Processor module 210 for receiving 6DOF data from a 1553 bus 260 and calculating IMU simulation data to the Optional signal modules ( Analog module 270, pulse module, parallel module 290, serial module 295), which is connected to the backplane bus 205;

(3) RAM module 230 for saving data and code for the processor module 210, which is connected to the backplane bus 205, which is connected to the backplane bus 205;

(4) EEPROM module 240 for saving data and code for the processor module 210 which is connected to the backplane bus 205;

(5) A commun module 220 for providing an interface for a monitoring PC, which is connected with the backplane bus 205 and the monitoring PC;

(6) The optional signal module includes Analog module 270, pulse module 280, parallel module 290, serial module 295, and is connected between the backplane bus 205 and a user specific signal regulator and connector board 250 for receiving IMU simulation data from the processor module 210 and providing IMU signal to the user specific signal regulator and connector board 250;

The analog module 270 provides analog signal to the user specific signal regulator and connector board 250;

The pulse module 280 provides pulse signal to the user specific signal regulator and connector board 250;

Parallel module 290 provides digital parallel signal to the user specific signal regulator and connector board 250;

Serial module 295 provides digital serial signal to the user specific signal regulator and connector board 250.

The user-specific signal regulator and connector board 250 is connected between the optional signal modules and the onboard avionics system 140, and is used for the specific user according to the specific IMU used in the simulated system. It means that there is no general-purpose signal regulator and connector board. For a specific IMU, we have to design a connector board to match it. This is because even if two IMUs have the same type of signal, they often have different signal ranges, scale factors, voltages, currents, and different connector arrangements. This board is often very simple. It usually consists of an amplifier, a buffer, a coupler and sometimes logic, it also forms a suitable connector for the specific installed system in order to replace the real IMU.

The 1553 bus 260 is used to interface with the 6DOF flight simulator. For meeting different requirements of the 6DOF flight simulator, the 1553 bus 260 can be replaced by other interface boards, such as a network adapter.

The RAM Module 230 and EEPROM module 240 can be included in the processor module or be replaced by a memory module.

Further, avionics module based IMU simulator may employs a open standard bus design, which can provide many advantages over a unique design:

1. Fast development cycles. The open standard bus provides the capability to deploy high-performance systems quickly and cost effectively. A system that might require one or two years for development when approached as a unique design can be integrated in a matter of months using open standard bus modules and components.

2. Configurable and Flexible. The open standard bus is scalable and modular. Its configurability allows users to structure an open standard bus system for any number of applications, from basic controllers to full-scale communication systems. Once systems are deployed, a user can enhance them by replacing or adding other open standard bus I/O modules or by upgrading the processor. This flexibility results in development and maintenance cost savings and allows system enhancements to be added without replacing the actual system.

3. Withstands harsh environments. Most open standard bus products are highly reliable and stable, with superior performance in harsh environments. They inherently have rugged characteristics due to the mechanical and connector specifications, and they are usually available in industrial temperature ranges. Open standard bus specification permits board level design enhancements that allow extreme temperature operation and high shock and vibration tolerances.

4. Operating Systems. The open standard bus also provides the widest range of off-the-shelf operating systems. Both non-real-time operating systems, such as UNIX, Windows and DOS, and real-time operating systems are available. Real-time systems, used for most control and data acquisition applications, range from fast and simple real-time kernels, like pSOS, to complete self-hosted development platforms, such as OS-9. These operating systems are often supplied by Open standard bus vendors to allow users to solve application problems more quickly at the system level rather than at the component level. Also, real-time operating systems isolate the user's application from the hardware, allowing reconfiguration of the system modules with minimal impact on application code.

5. Flexible implementations. Implementation cost of open standard bus systems is directly proportional to the performance and functionality required. The open standard bus specification permits use of open standard bus modules with any mix of functionality, and it allows open standard bus modules to have different electronic design implementations. Module designs range from a very basic interface, costing only a few dollars to implement, to advanced multiprocessing interface designs. Open standard bus modules are also compatible with each other at the lowest common interfacing method between the two devices (for example, 8-bit data interface). These features allow the user to scale performance and functionality to meet overall system budgets.

Figure 5:
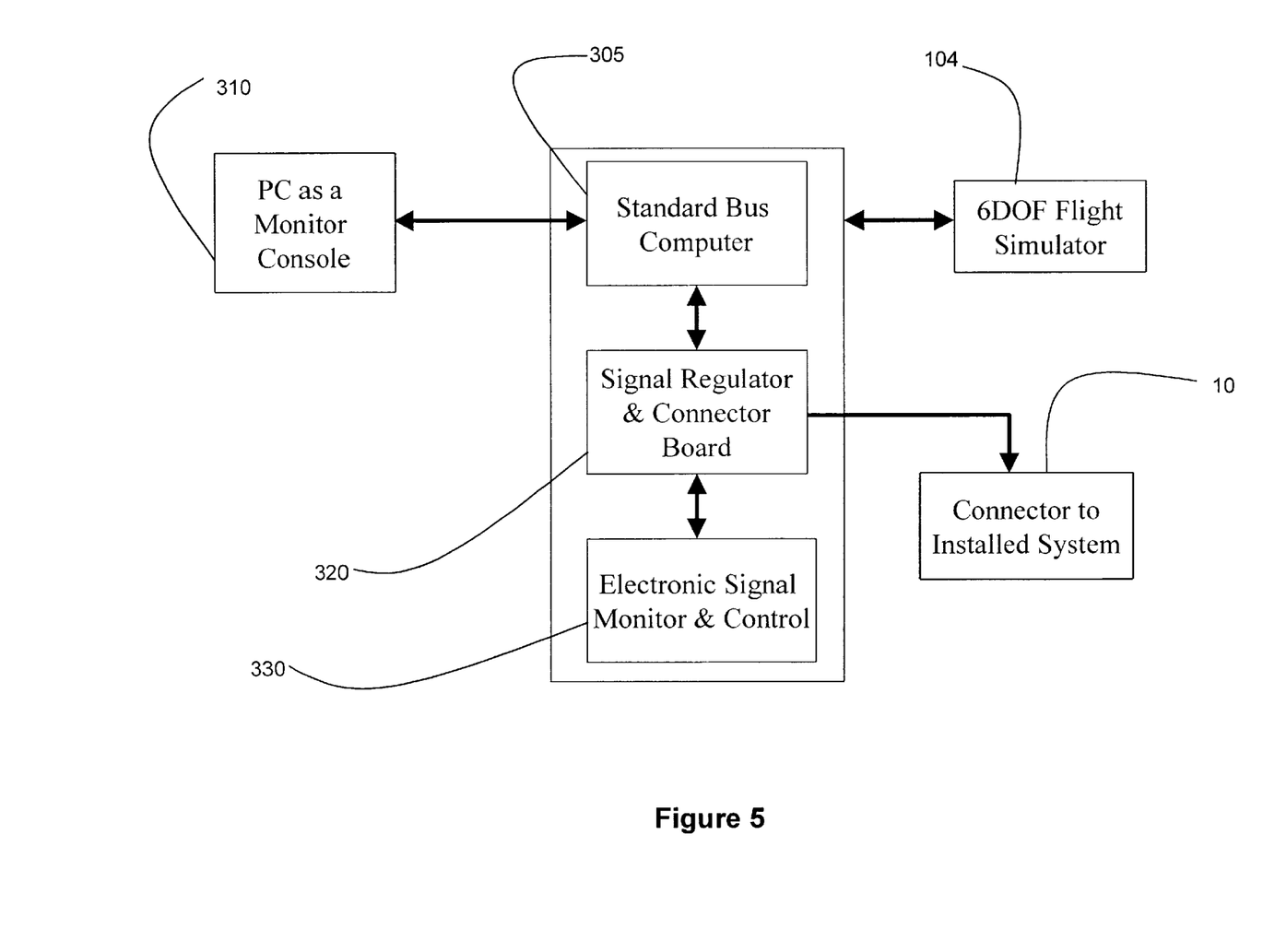
FIG. 5 is a block diagram illustrating the open standard IMU simulator.

Referring to FIG. 5, the open structure IMU simulator comprises:
(1) An standard bus computer 305 as the computation platform, which has an open standard bus architecture;
(2) A PC as the monitor 310 console to provide a man-machine interface;
(3) A signal regulator and connector board 320 for converting the electronic signals generated by the standard bus computer 305 into a suitable form and connection so that they can be directly injected into the installed system 10.
(4) An electronic signal monitor and control 330 for monitoring and calibrating the signal on every connector line to the installed system 10.

Figure 6:
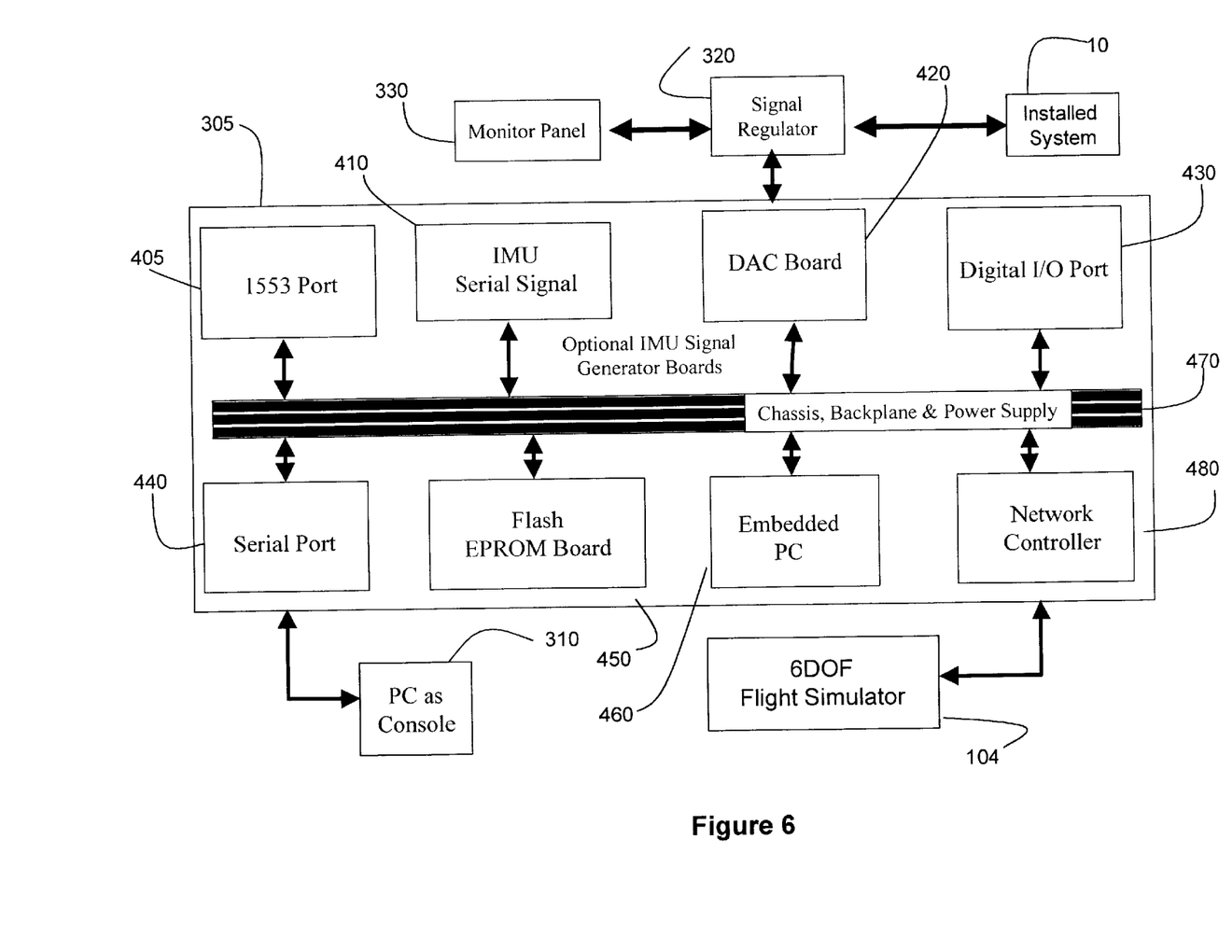
FIG. 6 is a block diagram illustrating architecture of the standard bus computer.

Referring to FIG. 6, the standard bus computer 305 further comprises:
(1) Chassis, backplane & power supply 470 for providing standard connection bus among modules; The candidates for the open standard include the STD32 bus, the VMEbus, the PCI bus, and ISA bus;
(2) Embedded PC 460 for receiving 6DOF data from a Network 480 and calculating IMU simulation data to the Optional signal modules ( DAC board 420, 1553 port 405, IMU serial signal 410, digital I/O port 430), which is connected to the Chassis, backplane & power supply 470;
(3) A serial port 440 for connecting a PC as console 310 to the standard bus computer 305;
(4) A flash EPROM board 450 for saving data and code for Embedded PC 460;
(5) A network controller 480 for connecting the 6DOF flight simulation 104 to the standard bus computer 305;
(6) The optional signal modules includes DAC board 420, 1553 port 405, IMU serial signal 410, digital I/O port 430 and other interface boards with the standard bus design for meeting different requirements of output data of the simulated IMU.

The embedded PC 460, serial port 440, and the Flash EPROM board can be replaced by a embedded microprocessing board.

What is claimed is:

1. A real-time IMU simulator for an Inertial Measurement Unit (IMU) of an installed avionics system of a vehicle, comprising:
a 6DOF flight simulator;
an IMU computer; and
a 6DOF(Degree of Freedom) interface, which is connected between said 6DOF flight simulator and said IMU computer, for transferring flight trajectory data from said 6DOF flight simulator to said IMU computer; wherein said IMU computer is adapted for receiving flight state data and calculating IMU simulation data and outputting said IMU simulation data to an IMU signal generation board, and said IMU signal generation board is adapted for receiving said IMU simulation data and generating IMU signals and injecting said IMU signals to said installed avionics system.

2. A real-time IMU simulator, as recited in claim 1, wherein said 6DOF interface is a standard RS-232C serial interface.

3. A real-time IMU simulator, as recited in claim 1, wherein said 6DOF interface is a RS-422 serial interface.

4. A real-time IMU simulator, as recited in claim 1, wherein said 6DOF interface is a Ethernet LAN interface.

5. A real-time IMU simulator, as recited in claim 1, wherein said 6DOF interface is a MIL-STD-1553A/B interface.

6. A real-time IMU simulator, as recited in claim 1, wherein said 6 DOF interface and said IMU signal generation board are outside from said IMU computer through a cable to be connected with said IMU computer.

7. A real-time IMU simulator, as recited in claim 6, wherein said IMU computer comprises:
a flight data Interface Module, which is a group of communication driver programs and drives different said 6DOF interfaces with their designated data formats,
a Trajectory Generation Module, which is an internal trajectory generator that makes said IMU simulator a self-contained system,
a Gyro Measurement Module, which receives said 6DOF data and outputs ideal simulation output data of gyros of said simulated IMU,
a Gyro Error Module, which includes a gyro error model and receives said 6DOF data and outputs errors of said simulation output data of said gyros of said simulated IMU,
an Accelerometer Measurement Module, which receives the 6DOF data and outputs ideal simulation output data of accelerometers of the simulated IMU,
an accelerometer Error Module, which includes a accelerometer error model and receives said 6DOF data and outputs errors of simulation output data of said accelerometers of said simulated IMU, an Electronic Signal Generation Module, which is a group of driver programs for said IMU signal generation hardware boards, and a user Interface and Monitoring Module, which provides an interface between a user and said IMU simulator.

8. A real-time IMU simulator, as recited in claim 1, wherein said 6 DOF interface and said IMU signal generation board are plugged in said IMU computer through a bus.

9. A real-time IMU simulator, as recited in claim 8, wherein said IMU computer comprises:

a flight data Interface Module, which is a group of communication driver programs and drives different said 6DOF interfaces with their designated data formats, a Trajectory Generation Module, which is an internal trajectory generator that makes said IMU simulator a self-contained system, a Gyro Measurement Module, which receives said 6DOF data and outputs ideal simulation output data of gyros of said simulated IMU, a Gyro Error Module, which includes a gyro error model and receives said 6DOF data and outputs errors of said simulation output data of said gyros of said simulated IMU, an Accelerometer Measurement Module, which receives the 6DOF data and outputs ideal simulation output data of accelerometers of the simulated IMU, an Accelerometer Error Module, which includes a accelerometer error model and receives said 6DOF data and outputs errors of simulation output data of said accelerometers of said simulated IMU, an Electronic Signal Generation Module, which is a group of driver programs for said IMU signal generation hardware boards, and a user Interface and Monitoring Module, which provides an interface between a user and said IMU simulator.

10. A real-time IMU simulator, as recited in claim 1, wherein said IMU computer comprises:

a flight data Interface Module, which is a group of communication driver programs and drives different said 6DOF interfaces with their designated data formats, a Trajectory Generation Module, which is an internal trajectory generator that makes said IMU simulator a self-contained system, a Gyro Measurement Module, which receives said 6DOF data and outputs ideal simulation output data of gyros of said simulated IMU, a Gyro Error Module, which includes a gyro error model and receives said 6DOF data and outputs errors of said simulation output data of said gyros of said simulated IMU, an Accelerometer Measurement Module, which receives the 6DOF data and outputs ideal simulation output data of accelerometers of the simulated IMU, an accelerometer Error Module, which includes an accelerometer error model and receives said 6DOF data and outputs errors of simulation output data of said accelerometers of said simulated IMU, an Electronic Signal Generation Module, which is a group of driver programs for said IMU signal generation hardware boards, and a user Interface and Monitoring Module, which provides an interface between a user and said IMU simulator.

11. A real-time IMU simulator, as recited in claim 1, wherein 6DOF (Degree of Freedom) interface, said IMU computer, and said EMU signal generation board are implemented based on a PC (Personal Computer) computer, comprising:

a 6DOF interface, which has a plurality of optional boards for different said 6DOF flight simulators, including:

a 1553 bus, a RS-422 serial interface, a RS-232c serial port, an adapter like Network adapter, a CRT monitor and a mouse and keyboard, which are under support of a software for user to operate the simulator, modify its parameters easily, and observe IMU data, a CPU Mainboard, which handles all management of the IMU simulator and calculates IMU simulation data, and an IMU signal generation board which comprises a digital parallel board, a pulse generator board, and an analog generator board, wherein said optional boards of said IMU signal generation board are selected to adapt various types of said IMU output signal of said simulated IMU.

12. A real-time IMU simulator, as recited in claim 1, wherein a signal regulator and connector board is connected between said IMU signal generation and said onboard avionics system and is used for a specific user according to specific said IMU used in said simulated system.

13. A real-time IMU simulator for an Inertial Measurement Unit (IMU) of an installed avionics system of a vehicle, comprising:

an IMU computer for reading flight state data from a data file with time label and calculating IMU simulation data and outputting said IMU simulation data in real-time way to a IMU signal generation board, wherein said data file with time label is generated and saved by a 6DOF flight simulator in advance before performing a ground test of said onboard avionics system, wherein said IMU signal generation board is adapted for receiving said IMU simulation data and generating IMU signals and injecting said IMU signals to said installed avionics systems.

14. A real-time IMU simulator, as recited in claim 13, wherein said IMU signal generation board are outside from said IMU computer through a cable to be connected with said IMU computer.

15. A real-time IMU simulator, as recited in claim 14, wherein said IMU computer comprises:

a flight data Interface Module, which is a group of communication driver programs and drives different said 6DOF interfaces with their designated data formats, a Trajectory Generation Module, which is an internal trajectory generator that makes said IMU simulator a self-contained system, a Gyro Measurement Module, which receives said 6DOF data and outputs ideal simulation output data of gyros of said simulated IMU, a Gyro Error Module, which includes a gyro error model and receives said 6DOF data and outputs errors of said simulation output data of said gyros of said simulated IMU, an Accelerometer Measurement Module, which receives the 6DOF data and outputs ideal simulation output data of accelerometers of the simulated IMU, an accelerometer Error Module, which includes a accelerometer error model and receives said 6DOF data and outputs errors of simulation output data of said accelerometers of said simulated IMU, an Electronic Signal Generation Module, which is a group of driver programs for said IMU signal generation hardware boards, and a user Interface and Monitoring Module, which provides an interface between a user and said IMU simulator.

16. A real-time IMU simulator, as recited in claim 13, wherein said IMU signal generation board are plugged in said IMU computer through a bus.

17. A real-time IMU simulator, as recited in claim 16, wherein said IMU computer comprises:

a flight data Interface Module, which is a group of communication driver programs and drives different said 6DOF interfaces with their designated data formats, a Trajectory Generation Module, which is an internal trajectory generator that makes said IMU simulator a self-contained system, a Gyro Measurement Module, which receives said 6DOF data and outputs ideal simulation output data of gyros of said simulated IMU, a Gyro Error Module, which includes a gyro error model and receives said 6DOF data and outputs errors of said simulation output data of said gyros of said simulated IMU, an Accelerometer Measurement Module, which receives the 6DOF data and outputs ideal simulation output data of accelerometers of the simulated IMU, an accelerometer Error Module, which includes a accelerometer error model and receives said 6DOF data and outputs errors of simulation output data of said accelerometers of said simulated IMU, an Electronic Signal Generation Module, which is a group of driver programs for said IMU signal generation hardware boards, and a user Interface and Monitoring Module, which provides an interface between a user and said IMU simulator.

18. A real-time IMU simulator, as recited in claim 13, wherein said IMU computer comprises:

a flight data Interface Module, which is a group of communication driver programs and drives different said 6DOF interfaces with their designated data formats, a Trajectory Generation Module, which is an internal trajectory generator that makes said IMU simulator a self-contained system, a Gyro Measurement Module, which receives said 6DOF data and outputs ideal simulation output data of gyros of said simulated IMU, a Gyro Error Module, which includes a gyro error model and receives said 6DOF data and outputs errors of said simulation output data of said gyros of said simulated IMU, an Accelerometer Measurement Module, which receives the 6DOF data and outputs ideal simulation output data of accelerometers of the simulated IMU, an accelerometer Error Module, which includes a accelerometer error model and receives said 6DOF data and outputs errors of simulation output data of said accelerometers of said simulated IMU, an Electronic Signal Generation Module, which is a group of driver programs for said IMU signal generation hardware boards, and a user Interface and Monitoring Module, which provides an interface between a user and said IMU simulator.

* * * * *

UNITED STATES PATENT AND TRADEMARK OFFICE
CERTIFICATE OF CORRECTION

PATENT NO.    : 6,234,799 B1                                                        Page 1 of 1
DATED         : May 22, 2001
INVENTOR(S)   : Ching-Fang Lin It is certified that error appears in the above-identified patent and that said Letters Patent is hereby corrected as shown below:

Column 1,
Line 15, after "Contract No. F08635-98-6865", insert -- and F08635-97-C-0030 --.

Signed and Sealed this

Twenty-sixth Day of November, 2002

Attest:

Attesting Officer

JAMES E. ROGAN
Director of the United States Patent and Trademark Office